US008892788B2

(12) United States Patent
Tsirkin

(10) Patent No.: US 8,892,788 B2
(45) Date of Patent: Nov. 18, 2014

(54) EXPOSING A DMA ENGINE TO GUESTS IN A VIRTUAL MACHINE SYSTEM

(75) Inventor: Michael Tsirkin, Yokneam (IL)

(73) Assignee: Red Hat Israel, Ltd., Raanana (IL)

(*) Notice: Subject to any disclaimer, the term of this patent is extended or adjusted under 35 U.S.C. 154(b) by 257 days.

(21) Appl. No.: 13/032,007

(22) Filed: Feb. 22, 2011

(65) Prior Publication Data
US 2012/0216188 A1    Aug. 23, 2012

(51) Int. Cl.
G06F 13/28    (2006.01)
G06F 9/455    (2006.01)

(52) U.S. Cl.
CPC .. G06F 9/45558 (2013.01); G06F 2009/45583 (2013.01)
USPC .............................................. 710/28; 710/22

(58) Field of Classification Search
None
See application file for complete search history.

(56) References Cited

U.S. PATENT DOCUMENTS

| 2006/0130060 | A1* | 6/2006 | Anderson et al. ................. 718/1 |
| 2006/0136720 | A1 | 6/2006 | Armstrong et al. |
| 2007/0083862 | A1* | 4/2007 | Wooldridge et al. ............. 718/1 |
| 2008/0222663 | A1* | 9/2008 | Carpenter et al. ............ 719/328 |
| 2008/0294808 | A1* | 11/2008 | Mahalingam et al. .......... 710/26 |
| 2010/0312941 | A1* | 12/2010 | Aloni et al. ................... 710/310 |

* cited by examiner

Primary Examiner — Idriss N Alrobaye
Assistant Examiner — David Martinez
(74) Attorney, Agent, or Firm — Lowenstein Sandler LLP

(57) ABSTRACT

A method and system for copying data within a guest using a direct memory access (DMA) engine. A computer system hosts a hypervisor and a guest. The hypervisor detects an inquiry of the guest about a DMA engine. In response to the inquiry, the hypervisor indicates to the guest that a DMA engine is available. The hypervisor then receives a DMA request from the guest, the DMA request indicating a source address and a target address for copying data. Both the source address and the target address are within an address space allocated to the guest. Based on one or more data transfer policies, the hypervisor determines whether to direct the DMA engine to copy the data for the guest.

21 Claims, 4 Drawing Sheets

EXPOSING A DMA ENGINE TO GUESTS IN A VIRTUAL MACHINE SYSTEM

TECHNICAL FIELD

Embodiments of the present invention relate to a computer system, and more specifically, to management of data transfer in a virtual machine system.

BACKGROUND

Direct memory access (DMA) is a feature of modern computers that allows hardware modules within the computer to access system memory independently of the central processing unit (CPU). Hardware modules that use DMA include disk drive controllers, graphics cards, network cards, sound cards, etc.

A typical computer system includes a DMA engine. The DMA engine is a dedicated data transfer device that can read incoming data from a hardware module and stores the data in the system memory for later retrieval by the CPU. The DMA engine can also read outgoing data from the system memory and write the data into a data buffer of a hardware module for use by the hardware module. Additionally, the DMA engine can perform data copies and scatter/gather operations, by which data is transferred to and from multiple memory areas in a single DMA transaction.

In a virtual machine system, operations of a guest are generally executed by the CPU. The CPU can be overloaded at times and, as a result, can slow down the operation of the guest. The performance of the system can be improved if some of the guest operations, such as data transfer operations, can be offloaded to the DMA engine. However, in a conventional virtual machine system, the DMA engine is in the host system and is not exposed to the guest.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for copying data within a guest using a direct memory access (DMA) engine. In one embodiment, a computer system hosts a hypervisor and a guest. The hypervisor detects an inquiry of the guest about a DMA engine. In response to the inquiry, the hypervisor indicates to the guest that a DMA engine is available. The hypervisor then receives a DMA request from the guest, the DMA request indicating a source address and a target address for copying data. Both the source address and the target address are within an address space allocated to the guest. Based on one or ore data transfer policies, the hypervisor determines whether to direct the DMA engine to copy the data for the guest.

Throughout the following description, the term "guest" refers to the software that runs or can run on a hypervisor. A guest can be installed on a disk, loaded into memory, or currently running. A guest may include one or more of the following: a firmware copy in memory, an operating system, additional installed software, a browser, applications running on the browser, etc. The term "virtual machine (VM)" refers to part of a hypervisor and the host running the hypervisor that are visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

Embodiments of the present invention allow a guest to transfer data (i.e., copy data) within its memory using a DMA engine. As a result, the load of the CPU can be reduced and the copied data does not need to occupy any part of the CPU cache. Performance of the system can be improved.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
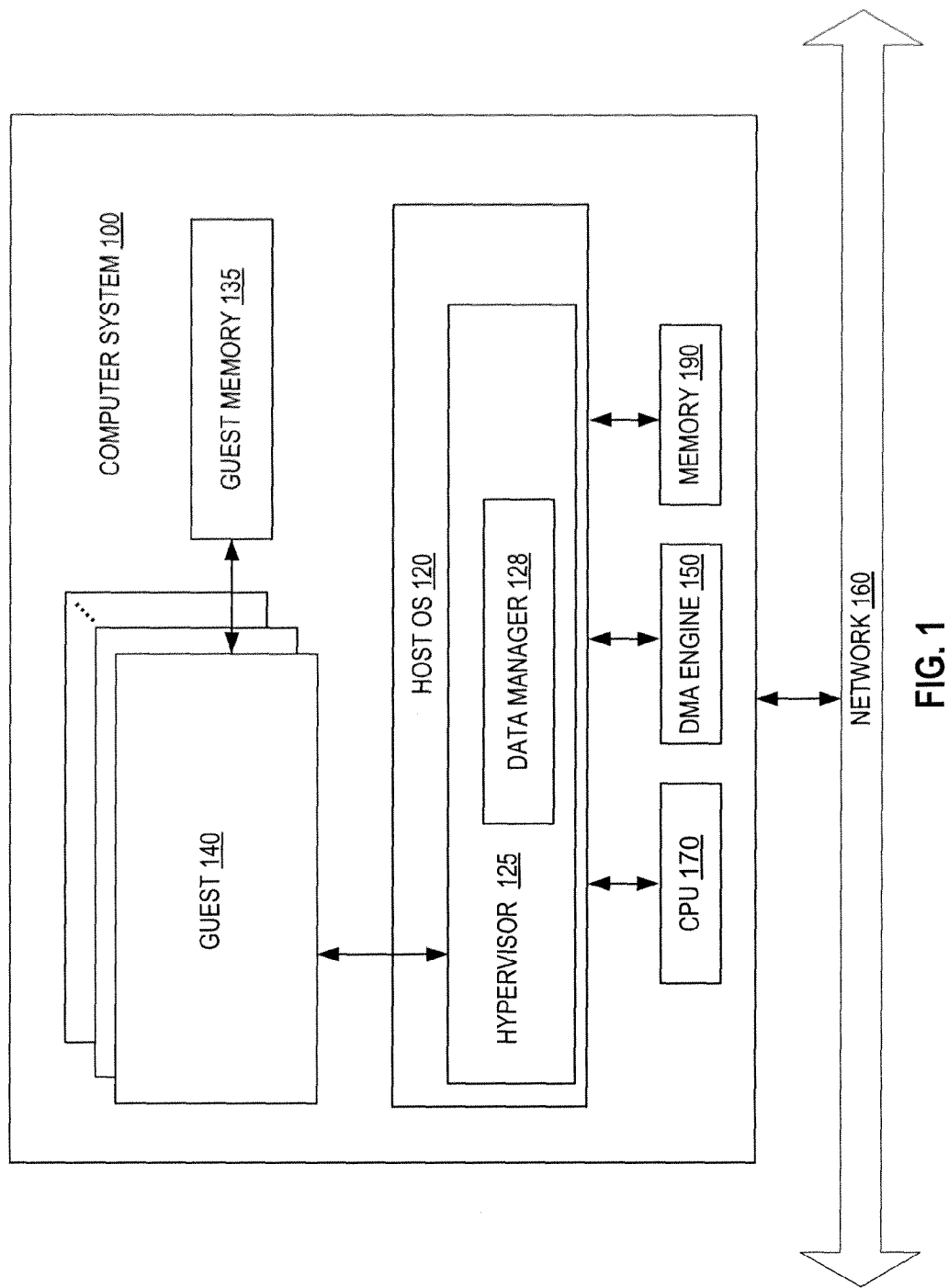
FIG. 1 is a block diagram of a computer system in which embodiments of the present invention may operate.

FIG. 1 is a block diagram that illustrates an embodiment of a computer system 100 in which embodiments of the present invention may operate. The computer system 100 is a virtual machine system that hosts one or more guests (e.g., guest 140). Each guest runs a guest operating system to manage its resources. The guests may run the same or different guest operating systems. Examples of the guest operating system include Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

In one embodiment, the computer system 100 runs a hypervisor 125 to virtualize access to the underlying host hardware for the guest 140, making the use of the host hardware transparent to the guest 140 and the users of the computer system 100. The hypervisor 125 may also be known as a virtual machine monitor (VMM) or a kernel-based hypervisor. In some embodiments, the hypervisor 125 may be part of a host OS 120.

In one embodiment, the computer system 100 is accessible by remote systems via a network 160. The network 160 may be a private network (e.g., a local area network (LAN), a wide area network (WAN), intranet, etc.) or a public network (e.g., the Internet). The computer system 100 also includes hardware components such as one or more physical central processing units (CPUs) 170, memory 190 and other hardware components. The computer system 100 also includes a direct memory access (DMA) engine 150 that performs system memory access (i.e., read and write) independently of the CPU 170 operations. The DMA engine 150 is capable of transferring data between a system memory (e.g., the memory 190) and a local memory of a hardware module. Examples of hardware modules include disk drive controllers, graphics cards, network cards, sound cards, etc.

According to one embodiment of the present invention, the hypervisor 125 includes a data manager 128 to direct the DMA engine 150 to perform data transfer operations for the guest 140. In one embodiment, the transfer data operation is between two memory locations within a guest memory 135 allocated to the guest 140. Although the guest memory 135 shown in FIG. 1 is separate from the main memory 190, the guest memory 135 may be co-located with the memory 190 in the same memory device. The data manager 128 exposes the DMA engine 150 to the guest 140, such that it appears to the guest 140 as if the DMA engine 150 is directly accessible by the guest 140. In one embodiment, the data manager 128 traps every DMA request from the guest 140 when the source and target of the data transfer are both within the guest memory 135. Based on one or more pre-determined policies, the data manager 128 also determines whether the guest's DMA request should be directed to the DMA engine 150.

Figure 2:
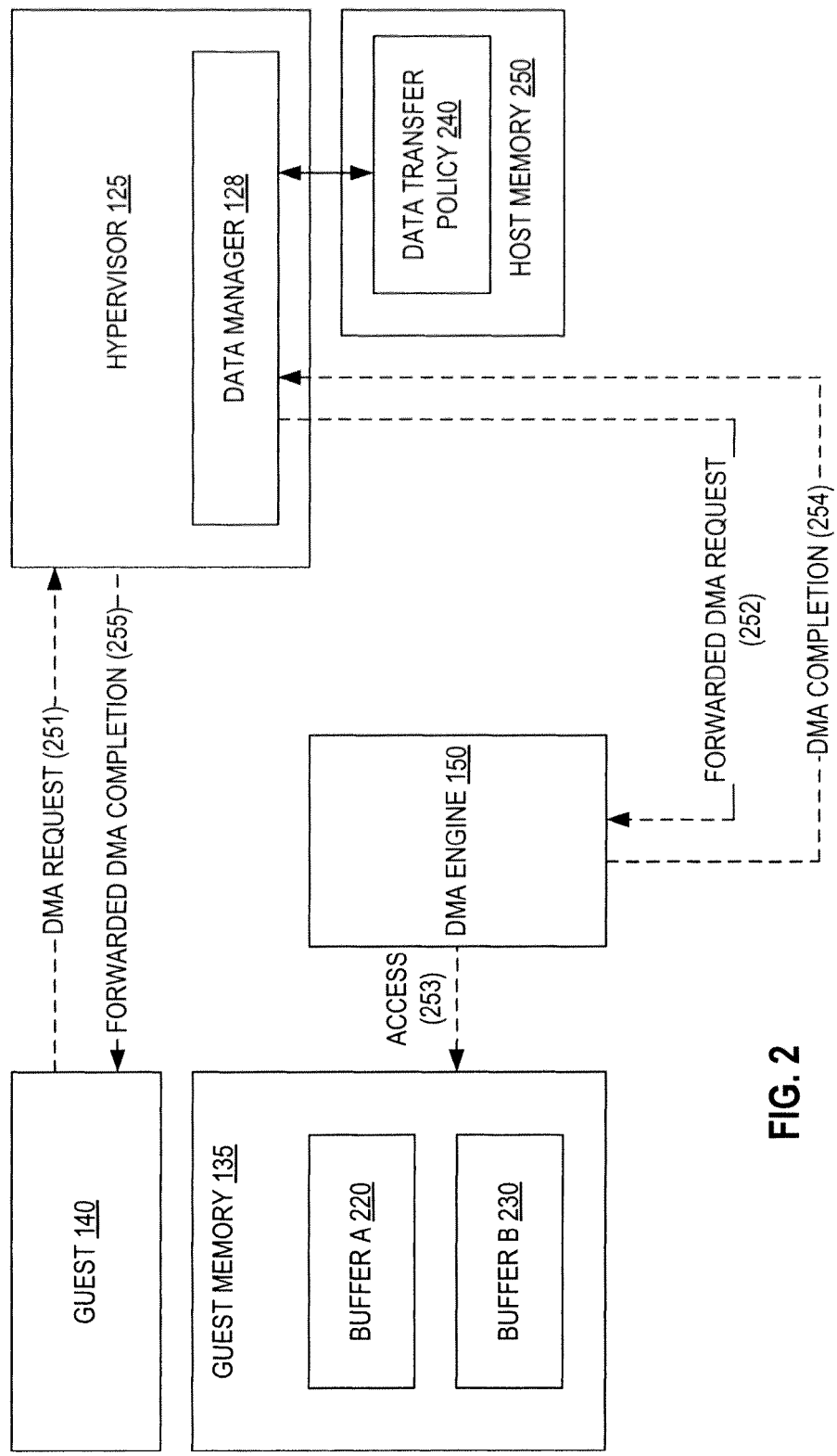
FIG. 2 illustrates an example of interactions between a hypervisor and a guest.

FIG. 2 is a diagram illustrating an example of the interactions between the hypervisor 125 and the guest 140. In one embodiment, the guest memory 135 includes a buffer A 220 and a buffer B 230. During operation, the guest 140 may need to copy data from the buffer A 220 (source) to the buffer B 230 (target). Both of the buffer A 220 and buffer B 230 are addressable by respective guest physical memory addresses. In one embodiment, the data manager 128 exposes the DMA engine 150 to the guest 140 before the data copying operation takes place. Thus, instead of attempting to copy the data through guest operations executed by the CPU, the guest 140 sends a DMA request (arrow 251) to the data manager 128.

In one embodiment, after the data manager 128 receives the DMA request, the data manager 128 checks data transfer policies 240 in a host memory 250 to determine whether the DMA request should be forwarded to the DMA engine 150. Generally, data copying performed by a DMA engine is slower than data copying by a CPU. However, if the CPU is heavily loaded or is busy with other time-sensitive tasks, it may be desirable to have the DMA engine 150 handle some of the copying operations for the guest 140. In one embodiment, the data transfer polices 240 include one or more of the following factors: whether the data in the source (i.e., the data to be copied) is in the CPU cache, when the data is needed at the target, whether the data transfer can be done asynchronously with guest operations, the level of the CPU workload, whether the length of copying time is critical, etc. According to the data transfer polices 240, the DMA engine 150 is to copy data for a guest if one or more of the following conditions are true: the data in the source is not in the CPU cache, the data is not to be needed at the target soon, data transfer can be done asynchronously with guest operations (that is, the guest is not idly waiting for the completion of copying), there is a need to offload the CPU (that is, the CPU load exceeds a threshold) and the length of copying time is not critical, the size of the data copy is larger than a predefined threshold, etc.

In one embodiment, some of the above conditions may be determined heuristically, as the exact status of the CPU and the CPU cache may not be known to the data manager 128. For example, the data manager 128 may determine that the data in the source (e.g., the buffer A 220) is unlikely to be in the CPU cache if the data was recently written into the source by a hardware device, or if the data was written into the source for direct access by a hardware device. As another example, the data manager 128 may determine that data to be copied to the target (e.g., the buffer B 230) is needed soon if the guest 140 passes a hint indicating that the data at the target is to be used by a socket in a low latency mode.

If the data manager 128 determines, based on the policies 240, that the copying should be performed by the DMA engine 150, the data manager 128 signals the DMA engine 150 (arrow 252) to direct the DMA request to the DMA engine 150. In response, the DMA engine 150 accesses (arrow 253) the guest memory 135 to copy data (e.g., from buffer A 220 to buffer B 230). After the DMA engine 150 completes the data copying, the DMA engine 150 notifies (arrow 254) the data manager 128 of the completion of the copying, and the data manager 128 forwards (arrow 255) this notification to the guest 140.

In one embodiment, the data manager 128 may send an interrupt to the guest 140 to signal the completion of the data copying operation. In an alternative embodiment, the data manager 128 may write a message into a pre-defined memory space accessible to the guest 140. The guest 140 checks this memory space after sending the DMA request to determine whether the DMA request has been completed. The guest 140 is informed of the completion of the data copying operation upon detection of the message written by the data manager 128.

According to embodiments of the present invention, the DMA engine 150 is exposed to the guest 140 when the guest 140 inquires about the existence of a DMA engine. For example, the guest 140 may inquire about the existence of a DMA engine when the guest 140 starts up or when the guest 140 checks its configuration. Upon detection of the inquiry, the data manager 128 exposes (that is, makes available) the DMA engine 150 to the guest 140 as if the DMA engine 150 exists within the guest's system. For example, the DMA engine 150 can be exposed to the guest 140 as a Peripheral Component Interconnect (PCI) device by the following operations: when the guest 140 performs PCI bus probing, the data manager 128 responds with the device ID and the vendor ID of the DMA engine 150. The guest 140 then detects the PCI device and attempts to program it; e.g., by programming an I/O address range. The data manager 128 traps this attempt. Further access to the given address range are then interpreted by data manager 128 as the guest's access to the DMA engine 150. Thus, when the guest wishes to copy data (e.g., perform scatter/gather operations) within the guest memory 135, the guest 140 can send a DMA request to the DMA engine 150 that is exposed to the guest 140.

According to embodiments of the present invention, a hypervisor does not need to trap all of the operations of its guests in order to identify guest data copying operations. Rather, a hypervisor only traps the guest's DMA requests, and selectively directs some of the data copying to the host's DMA engine based on pre-defined data transfer policies. As a result, a guest 140 is able to take advantage of DMA data copying under the control of the hypervisor 125.

Figure 3:
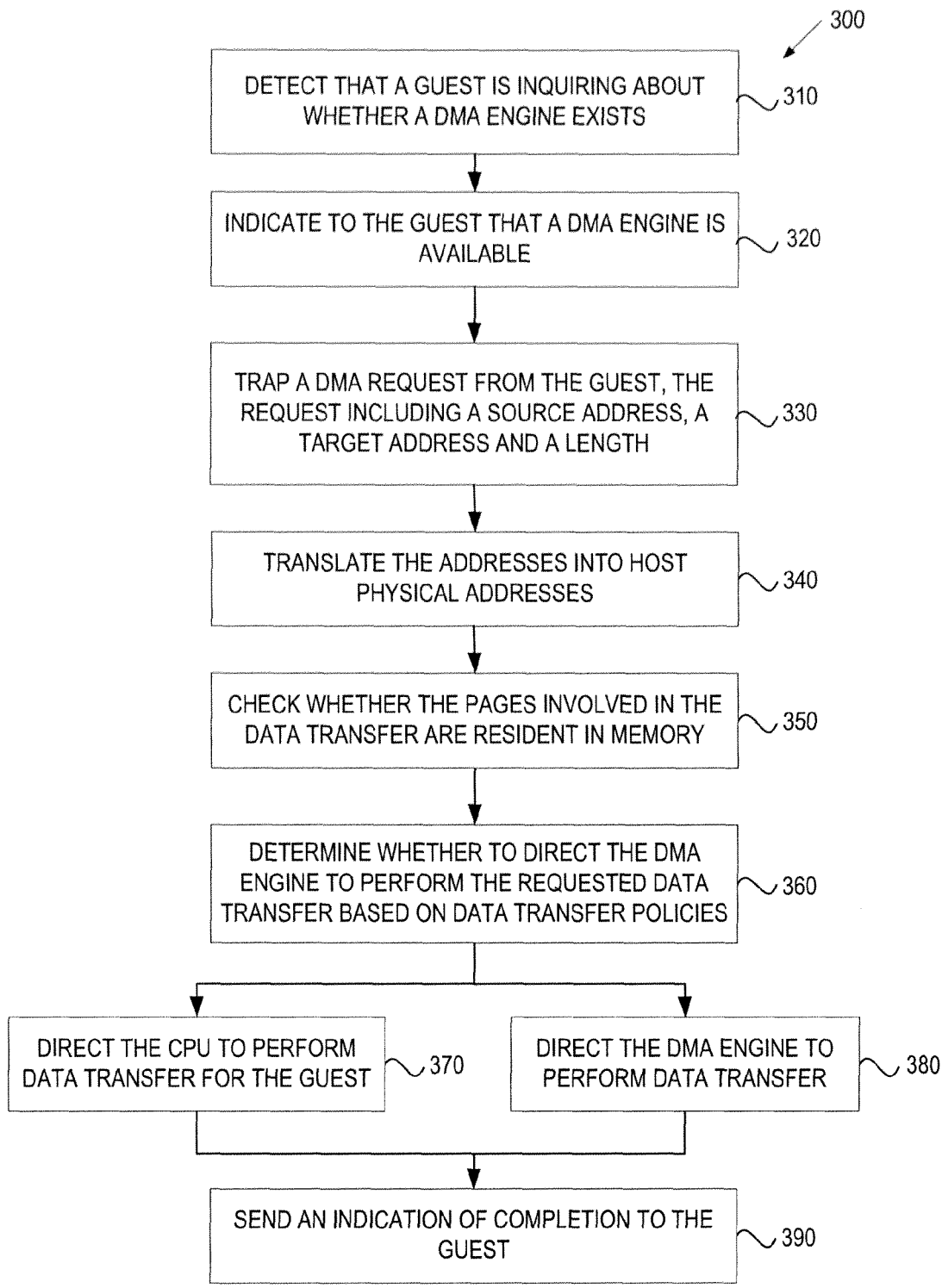
FIG. 3 is a flow diagram of one embodiment of a method for copying data within a guest using a DMA engine.

FIG. 3 is a flow diagram illustrating one embodiment of a method 300 for copying data within a guest using a DMA engine. The method 300 may be performed by a computer system 400 of FIG. 4 that may comprise hardware (e.g., circuitry, dedicated logic, programmable logic, microcode, etc.), software (e.g., instructions run on a processing device), or a combination thereof. In one embodiment, the method 300 is performed by the data manager 128 of FIG. 1 and FIG. 2.

Referring to FIG. 3, in one embodiment, the method 300 begins when the data manager 128 detects that the guest 140 is checking whether a DMA engine is available (block 310). For example, the detection may be made when the guest 140 starts up or when the guest 140 checks its configuration. Upon detection of the inquiry, the data manger 128 indicates to the guest 140 that a DMA engine (e.g., the DMA engine 150) exists (block 320). During operation of the guest 140, the guest 140 is about to transfer (e.g., copy) data from one guest memory location to other guest memory location. At this point, the guest 140 sends a DMA request to the DMA engine (block 330). The request includes a source address, a target address and the length of the data to be transferred. Both of the source and target addresses are in the address space of the memory allocated to the guest 140 (i.e., the guest physical memory address space). The data manager 128 traps this request (block 330). The data manager 128 translates the source and target addresses from the guest physical memory addresses into the host physical memory addresses (block 340).

In one embodiment, the data manager 128 also checks whether the pages involved in the data transfer are resident in the memory (instead of in a secondary memory, such as disks) (block 350). If any of the pages are not resident in the memory, the data manager 128 swaps those pages into the memory.

In one embodiment, the data manager 128 determines whether the DMA request should be forwarded to the DMA engine 150 based on pre-defined data transfer policies 240 (block 360). The data transfer policies 240 have been described in detail above in connection with FIG. 2. If the data manager 128 determines that the request should not be forwarded to the DMA engine 150, the data manager 128 will direct the request to the CPU with the translated source and target addresses (block 370). The CPU then executes the data transfer operations for the guest 140. If the data manager 128 determines that the request should be forwarded to the DMA engine 150, the data manager 128 will direct the request to the DMA engine 150 with the translated source and target addresses for the DMA engine 150 to perform the data transfer (block 380). After the data transfer is completed, the data manager 128 sends an indication of completion to the guest 140 (block 390).

If the DMA engine 150 performs the data transfer, the DMA engine sends a completion signal to the hypervisor 125 after its finishes the data transfer. The data manager 128 then forwards this signal to the guest 140 to inform the guest 140 of the completion of data transfer. In one embodiment, the data manager 128 may inform the guest 140 of the completion by sending an interrupt signal to the guest 140. In an alternative embodiment, the data manager 128 may inform the guest 140 of the completion by writing a message into a pre-defined memory space accessible to the guest 140.

Figure 4:
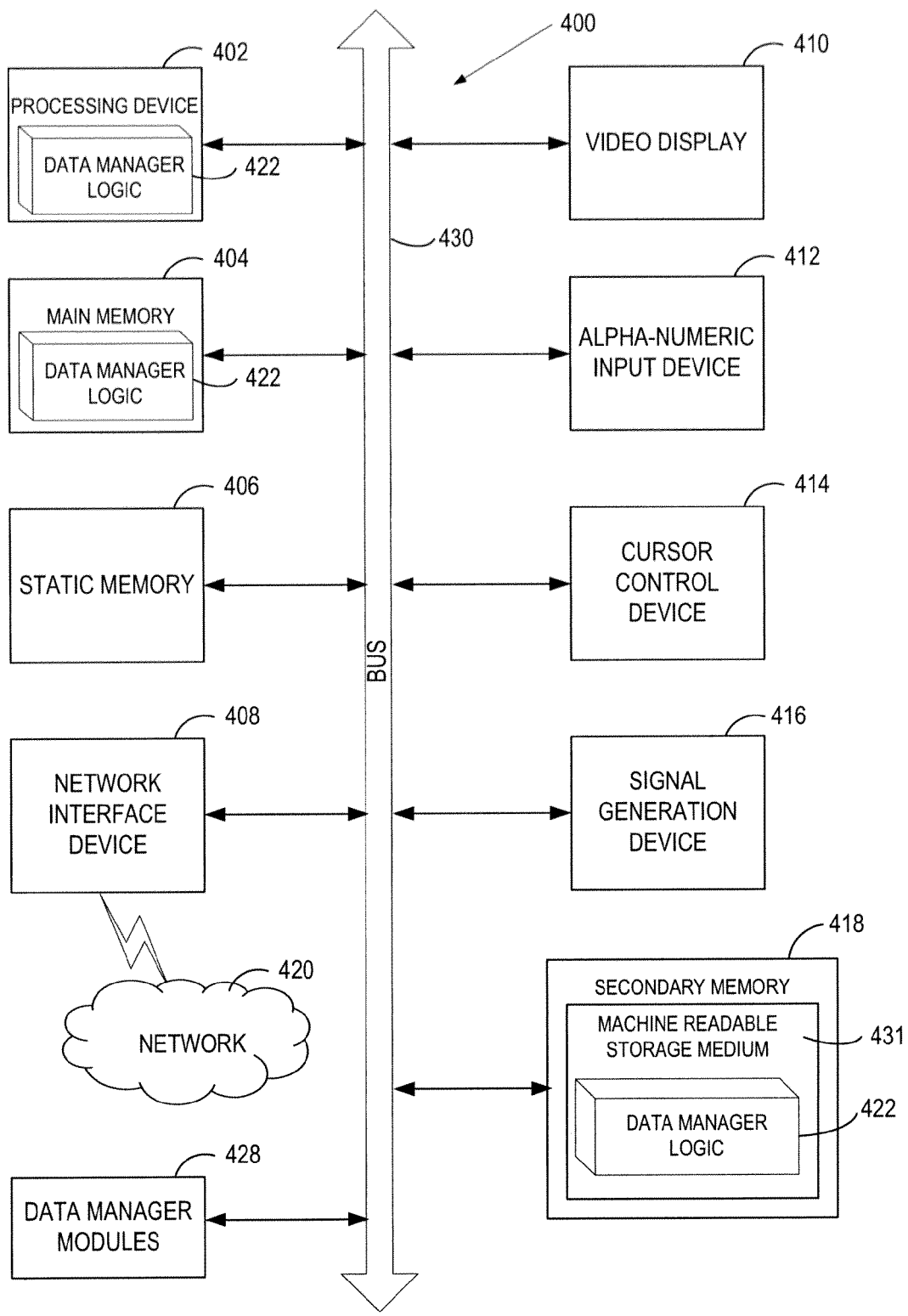
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute data manager logic 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., data manager logic 422) embodying any one or more of the methodologies or functions described herein (e.g., the data manager 128 and the hypervisor 125 of FIGS. 1 and 2). The data manager logic 422 may also reside, completely or at least partially, within the main memory 404 and/or within the processing device 402 during execution thereof by the computer system 400; the main memory 404 and the processing device 402 also constituting machine-readable storage media. The data manager logic 422 may further be transmitted or received over a network 420 via the network interface device 408.

The machine-readable storage medium 431 may also be used to store the data manager logic 422 persistently. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or ore sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 400 may additionally include data manager modules 428 for implementing the functionalities of the data manager 128 and the hypervisor 125 of FIGS. 1 and 2. The module 428, components and other features described herein (for example in relation to FIG. 1) can be implemented as discrete hardware components or integrated in the functionality of hardware components such as ASICS, FPGAs, DSPs or similar devices. In addition, the module 428 can be implemented as firmware or functional circuitry within hardware devices. Further, the module 428 can be implemented in any combination of hardware devices and software components.

Some portions of the detailed descriptions which follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "detecting", "indicating", "receiving", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by a computer system, comprising:
   detecting, by a hypervisor executed by a processing device of the computer system, an inquiry of a guest hosted by the computer system about a direct memory access (DMA) engine;
   in response to the inquiry, indicating to the guest that the DMA engine is available;
   identifying, by the hypervisor, a DMA request from the guest, the DMA request comprising a source address and a target address for copying data, the source address and the target address being within an address space allocated to the guest;
   in view of at least one condition pertaining to the data and defined in one or more data transfer policies, determining, by the hypervisor and in response to the DMA request from the guest, whether to direct the DMA engine to copy the data for the guest; and
   providing, by the hypervisor to the guest, an indication of completion of copying the data.

2. The method of claim 1, wherein determining whether to direct the DMA engine to copy the data further comprises:
   based on the one or more data transfer policies, determining that a central processing unit (CPU) is to copy the data for the guest.

3. The method of claim 1, wherein the inquiry of the guest is detected when the guest starts up or when the guest checks a configuration of the guest.

4. The method of claim 1, wherein the data transfer policies comprise:
   determining whether the data in the source address is in a CPU cache.

5. The method of claim 1, wherein the data transfer policies comprise:
   determining when the data is needed at the target address.

6. The method of claim 1, wherein the data transfer policies comprise one or more of the following:
   determining whether the data is to be copied asynchronously with guest operations; or
   determining whether CPU load exceeds a threshold and the length of copying time is not critical.

7. The method of claim 1, wherein the data transfer policies comprise:
   determining whether the size of the data is greater than a pre-defined threshold.

8. The method of claim 1, wherein providing, by the hypervisor to the guest, an indication of completion of copying the data further comprises:
   forwarding, by the hypervisor, the indication of completion of copying the data from the DMA engine to the guest.

9. A system comprising:
   a host memory to store data transfer policies;
   a direct memory access (DMA) engine;
   a hypervisor coupled to the host memory and the DMA engine, the hypervisor operable to:
   detect an inquiry of the guest about a DMA engine,
   in response to the inquiry, indicate to the guest that the DMA engine is available;
   identify a DMA request from the guest, wherein the DMA request comprises a source address and a target address for copying data, the source address and the target address being within an address space allocated to the guest managed by the hypervisor;

in view of at least one condition pertaining to the data and defined in one or more of the data transfer policies, determine, in response to the DMA request from the guest, whether to direct the DMA engine to copy the data for the guest; and provide to the guest an indication of completion of copying the data.

10. The system of claim 9, wherein the hypervisor further determines that a central processing unit (CPU) is to copy the data for the guest based on the one or more data transfer policies.

11. The system of claim 9, wherein the inquiry of the guest is detected when the guest starts up or when the guest checks a configuration of the guest.

12. The system of claim 9, wherein the data transfer policies comprise one or more of the following:
   a determination of whether the data in the source address is in a CPU cache; or
   a determination of when the data is needed at the target address.

13. The system of claim 9, wherein the data transfer policies comprise one or more of the following:
   a determination of whether the data is to be copied asynchronously with guest operations; or
   a determination of whether CPU load exceeds a threshold and the length of copying time is not critical.

14. The system of claim 9, wherein the data transfer policies comprise:
   a determination of whether the size of the data is greater than a pre-defined threshold.

15. A non-transitory computer readable storage medium including instructions that, when executed by a computer system, cause the computer system to perform a method comprising:
   detecting, by a hypervisor executed by a processing device of the computer system, an inquiry of a guest hosted by the computer system about a direct memory access (DMA) engine;
   in response to the inquiry, indicating by the hypervisor to the guest that the DMA engine is available;
   identifying, by the hypervisor, a DMA request from the guest, the DMA request comprising a source address and a target address for copying data, the source address and the target address being within an address space allocated to the guest;
   in view of least one condition pertaining to the data and defined in one or more data transfer policies, determining, by the hypervisor and in response to the DMA request from the guest, whether to direct the DMA engine to copy the data for the guest; and
   providing, by the hypervisor to the guest, an indication of completion of copying the data.

16. The non-transitory computer readable storage medium of claim 15, wherein determining whether the DMA engine is to copy the data further comprises:
   based on the one or more data transfer policies, determining that a central processing unit (CPU) is to copy the data for the guest.

17. The non-transitory computer readable storage medium of claim 15, wherein the inquiry of the guest is detected when the guest starts up or when the guest checks a configuration of the guest.

18. The non-transitory computer readable storage medium of claim 15, wherein the data transfer policies comprise one or more of the following:
   determining whether the data in the source address is in a CPU cache; or
   determining when the data is needed at the target address.

19. The non-transitory computer readable storage medium of claim 15, wherein the data transfer policies comprise one or more of the following:
   determining whether the data is to be copied asynchronously with guest operations; or
   determining whether CPU load exceeds a threshold and the length of copying time is not critical.

20. The non-transitory computer readable storage medium of claim 15, wherein the data transfer policies comprise:
   determining whether the size of the data is greater than a pre-defined threshold.

21. The non-transitory computer readable storage medium of claim 15, wherein providing, by the hypervisor to the guest, an indication of completion of copying the data further comprises:
   forwarding, by the hypervisor the indication of completion of copying the data from the DMA engine to the guest.

* * * * *